May 10, 1932.   W. R. SMITTLE   1,858,173
PACKING RING
Filed June 23, 1931

Inventor
Walter R. Smittle
By Clarence A. O'Brien
Attorney

Patented May 10, 1932

1,858,173

UNITED STATES PATENT OFFICE

WALTER R. SMITTLE, OF ST. LOUIS, MISSOURI

PACKING RING

Application filed June 23, 1931. Serial No. 546,385.

This invention relates to a packing ring, the present invention being an improvement over that form of the subject matter of an application filed by me on February 18, 1931, Serial No. 516,816.

The general object of this invention is to make the ring somewhat similar to that described in the beforementioned application, but to provide the inner and outer sectional rings, with a plurality of straight or flat faces for contacting each other, so that the inner ring under the action of the internal spring will expand outwardly against the outer ring to break the joint on the outer ring, and to produce a sliding and wedge-like effect that seals the outer ring and the inner ring together, and at the same time compensates for wear.

This invention also consists in certain other features of the invention and in the combination and arrangement of the several parts, to be hereinafter fully described, illustrated in the accompanying drawings, and specifically pointed out in the appended claims.

In describing the invention in detail, reference will be had to the drawings wherein like characters denote like or corresponding parts throughout the several views, and in which:—

Figure 1:
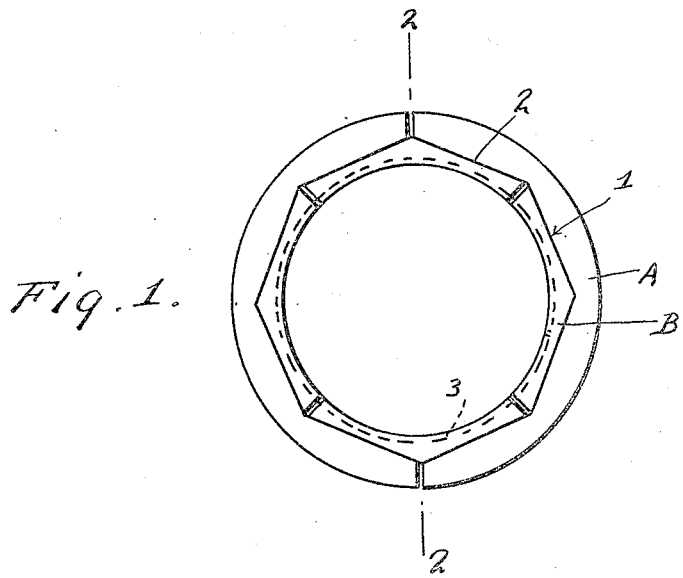
Figure 2:
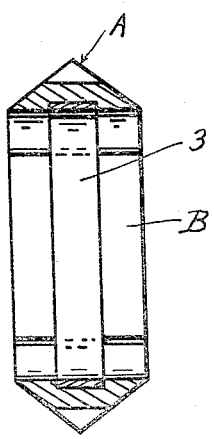
Figure 3:
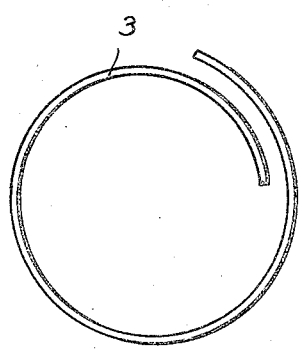

Figure 1 is an elevation of the invention.
Fig. 2 is a section on the line 2—2 of Fig. 1.
Fig. 3 is a view of the expansion ring.

In the drawings, the letter A indicates the outer ring and the letter B indicates the inner ring. The outer ring A is formed of two sections and the inner ring is preferably formed of four sections as shown in Fig. 1. The outer ring has its inner circumference formed of a plurality of flat or straight faces 1 and the inner ring has its outer circumference formed of a number of flat or straight faces, with the faces of one ring contacting the faces of the other ring as clearly shown in Fig. 1.

The inner ring is formed with a groove to receive a spring 3 and this spring is preferably formed with more than one convolution and it acts to press the inner ring outwardly against the outer ring, and the pressure of the fluid passing through the conduit in the joints of which the ring is placed and will also act to press the parts outwardly so as to keep the packing tight without the aid of adjustment.

The device taken as a whole is substantially of triangular shape in cross section as shown in Fig. 2. As before stated the flat faces contact with each other and will eventually cause the inner ring under the action of the fluid pressure and the pressure of the spring 3 to expand outwardly the outer ring and break the joint on the outer ring, and this arrangement of the parts produces a sliding and wedging effect through the outer ring and the inner ring together, and at the same time compensates for wear.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:—

1. A packing ring of the class described comprising inner and outer rings each formed of a number of sections, the ends of the sections abutting each other when each ring is contracted, the inner circumference of the outer ring being formed with a plurality of flat or straight faces, and the outer circumference of the inner ring being formed of similar straight faces, the flat faces of one ring contacting with the flat faces of the other ring and a spring located in the inner ring for forcing the rings outwardly.

2. A packing ring of the class described of triangular shape in cross section and comprising inner and outer rings each formed of a number of sections, the ends of the sections abutting each other when the ring is contracted, the inner circumference of the outer ring being formed of a plurality of flat or straight faces and the outer circumference of the inner ring being formed of similar straight faces, and the flat faces of one ring contacting with the flat faces of the other ring, the inner circumference of the inner ring having an annular groove therein, and a coiled spring located in the groove for forcing the rings outwardly.

In testimony whereof I affix my signature.

WALTER R. SMITTLE.